United States Patent
Georgis

(10) Patent No.: US 10,740,643 B2
(45) Date of Patent: Aug. 11, 2020

(54) AUTOMATIC LICENSE PLATE RECOGNITION BASED ON AUGMENTED DATASETS

(71) Applicant: SONY CORPORATION, Tokyo (JP)

(72) Inventor: Nikolaos Georgis, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 147 days.

(21) Appl. No.: 16/114,904

(22) Filed: Aug. 28, 2018

(65) Prior Publication Data

US 2020/0074211 A1  Mar. 5, 2020

(51) Int. Cl.
*G06K 9/34* (2006.01)
*G06K 9/32* (2006.01)
*G06K 9/62* (2006.01)

(52) U.S. Cl.
CPC .......... *G06K 9/3258* (2013.01); *G06K 9/344* (2013.01); *G06K 9/6257* (2013.01); *G06K 2209/01* (2013.01); *G06K 2209/15* (2013.01)

(58) Field of Classification Search
CPC .... G06K 9/3258; G06K 9/344; G06K 9/6257; G06K 2209/15; G06K 2209/01
See application file for complete search history.

(56) References Cited

U.S. PATENT DOCUMENTS

| | | | | |
|---|---|---|---|---|
| 5,651,075 A * | 7/1997 | Frazier | ............... | G06K 9/3258 382/105 |
| 7,734,097 B1 * | 6/2010 | Porikli | ............... | G06K 9/522 382/156 |
| 9,363,357 B2 | 6/2016 | Hansen | | |
| 2014/0369567 A1 | 12/2014 | Chigos et al. | | |
| 2017/0177965 A1 * | 6/2017 | Gordo Soldevila | ..... | G06K 9/66 |
| 2018/0018869 A1 | 1/2018 | Ahmad et al. | | |
| 2018/0285690 A1 * | 10/2018 | Goswami | ............ | G06K 9/6262 |

FOREIGN PATENT DOCUMENTS

CN  105551261 A  5/2016

OTHER PUBLICATIONS

Hegde, et al., "Automatic License Plate Detection Using Deep Learning Techniques", International Journal of Scientific Research Today, ISSN (online) 2394-9589/vol. 5(1), May 2017, pp. 107-112.

* cited by examiner

*Primary Examiner* — Siamak Harandi
(74) *Attorney, Agent, or Firm* — Chip Law Group

(57) ABSTRACT

An electronic device that captures a plurality of images by an image sensor. The electronic device includes control circuitry that generates a plurality of synthetic license plate images for each original license plate templates that are associated with a first hotlist of vehicles. The control circuitry generates a first augmented dataset of synthetic license plate images by an image transformation on the generated plurality of synthetic license plate images. The control circuitry trains a first neural network model using the generated first augmented dataset as a training dataset. The control circuitry detects a first vehicle in the captured plurality of images based on the extracted first license plate image portion and the trained first neural network model. The extracted first license plate image portion includes a first license plate identifier in the first hotlist of vehicles.

24 Claims, 6 Drawing Sheets

AUTOMATIC LICENSE PLATE RECOGNITION BASED ON AUGMENTED DATASETS

CROSS-REFERENCE TO RELATED APPLICATIONS/INCORPORATION BY REFERENCE

None.

FIELD

Various embodiments of the disclosure relate to automatic license plate recognition. More specifically, various embodiments of the disclosure relate to an electronic device for license plate recognition based on augmented datasets.

BACKGROUND

Recent advancements in the field of image processing have led to development of various methods and techniques for automatic license plate recognition (ALPR). In conventional automatic license plate recognition (ALPR) systems or devices, a camera may capture an image/video which includes a number of vehicles. Typically, in the conventional systems, an optical character recognition (OCR) technique is applied on each license plate of each vehicle in the captured image, to extract a number of license plate numbers from the captured image. Thereafter, the extracted license plate numbers are matched with license plate numbers in received hotlist. This is very time consuming and error-prone. Further, in certain scenarios, the captured image may include a large number of license plates. In such scenarios, application of the OCR technique on each of the large number of license plates, may be a computationally resource intensive process. Further, in the case where a device executing the ALPR is an embedded device, for example, an embedded in-vehicle device in a police car, such conventional techniques may adversely affect the total cycle time and response time of the ALPR process. As a consequence, a suspect vehicle (in the hotlist) may not be detected with certain time, and may escape undetected. In other scenarios, the license plates of the vehicles in the captured image/video, may be tilted, skewed, blurred or pixelated as the angle, speed, and distance of different vehicles with respect to the position of the camera may be different. In such scenarios, conventional ALPR methods and systems may be inefficient, error-prone, and may even fail to extract correct sequence of license plates numbers.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for hotlist-based automatic license plate recognition using augmented dataset are provided and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a device for hotlist-based automatic license plate recognition using an augmented dataset. The disclosed electronic device effectively minimizes the total cycle time of license plate recognition with improved accuracy as compared to conventional systems. In real-world scenarios, license plates of numerous vehicles in the captured image/video, may be tilted, skewed, blurred or pixelated as the angle, speed, visibility, and distance of different vehicles with respect to the position of the camera may be different. Further, different time of day, different lighting conditions, and shade falling on license plates of vehicles also adversely affect license plate number recognition. Even in such scenarios, the disclosed electronic device is able to accurately detect a vehicle based on a trained neural network model, which is trained using augmented dataset of license plate representations.

Figure 1:
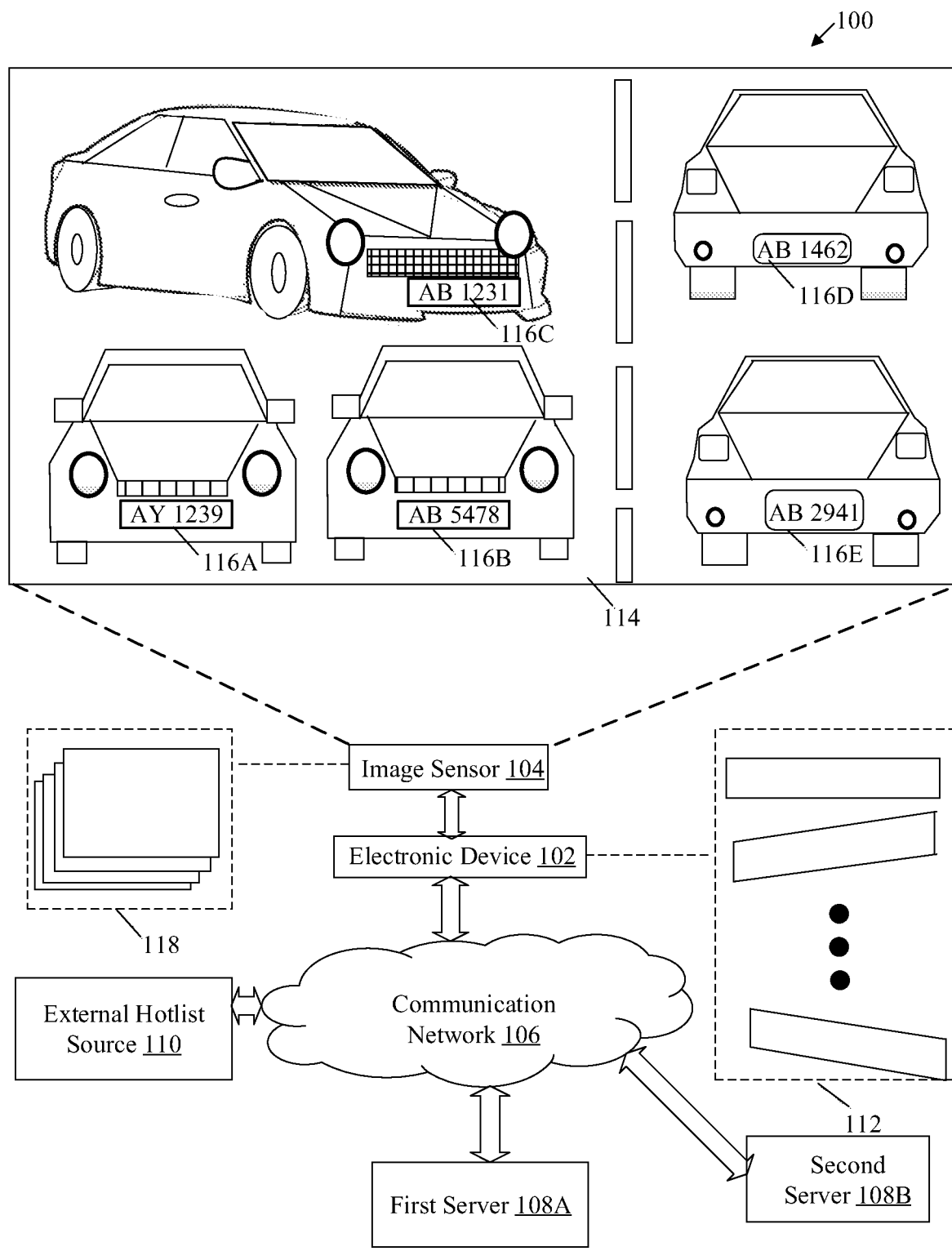
FIG. 1 is a block diagram that illustrates an exemplary environment for an electronic device for hotlist-based license plate recognition, in accordance with an embodiment of the disclosure.

FIG. 1 is a block diagram that illustrates an exemplary environment for implementing an exemplary electronic device for license plate recognition, in accordance with an embodiment of the disclosure. With reference to FIG. 1, there is shown a network environment 100 comprising an electronic device 102, an image sensor 104, a communication network 106, a first server 108A, a second server 108B, and an external hotlist source 110. The electronic device 102 may be communicatively coupled to the image sensor 104. In one example, the image sensor 104 may be a component of the electronic device 102.

The electronic device 102 may comprise suitable logic, circuitry, interfaces, and/or code that may be configured to generate an augmented dataset of synthetic license plate images based on a plurality of hotlists of vehicles received at the electronic device 102 from the external hotlist source 110. The electronic device 102 may be configured to store a plurality of original license plate templates associated with a plurality of hotlists of vehicles. The electronic device 102 may be configured to extract one or more license plate images from one or more digital images or videos. Examples of the electronic device 102 may include, but are not limited to an Automatic License Plate Recognition (ALPR) device, a computer workstation, a mainframe computer, a handheld computer, a cellular/mobile phone, and other computing devices.

The image sensor 104 may comprise suitable logic, circuitry, interfaces, and/or code that may be configured to capture one or more images. Examples of the one or more images may include a High Dynamic Range (HDR) image, a RAW image, and a JPEG image. The image sensor 104 may be configured to transmit or otherwise communicate the captured one or more images as input to the electronic device 102 for processing. The image sensor 104 may include a lens assembly that may enable capture of the one or more images from a field of view of the image sensor 104. The image sensor 104 may be implemented by use of a charge-coupled device (CCD) technology or complementary metal-oxide-semiconductor (CMOS) technology. Examples of implementations of the image sensor 104 may include, but are not limited to, at least a closed circuit television (CCTV) camera, a digital camera, a camcorder, and an action camera. In some embodiments, the image sensor 104 may be implemented as an integrated unit of the electronic device 102 or a separate device.

The communication network 106 may include a medium through which the electronic device 102 may communicate with the first server 108A and the second server 108B. Examples of the communication network 106 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The first server 108A may comprise suitable circuitry, interfaces, and/or code that may be configured to train one or more neural network models based on training dataset. In some embodiments, the trained neural network models or information associated with the trained neural network models may be communicated to the electronic device 102. The first server 108A may be configured to communicate with the electronic device 102 via the communication network 106. Examples of the first server 108A may include, but are not limited to, an application server, a cloud server, a web server, a database server, a file server, a mainframe server, or a combination thereof.

The second server 108B may comprise suitable circuitry, interfaces, and/or code that may be configured to store a database which may include one or more data items associated with vehicles. In an exemplary implementation, the second server 108B may be owned, managed, or operated by an entity (e.g., department of motor vehicles (DMV)) that administers issuance of driver license, license plate numbers, and/or vehicle registration in a specific geographical area, such as a state. The second server 108B may be configured to communicate with the electronic device 102 via the communication network 106. Examples of the second server 108B may include, but are not limited to, an application server, a cloud server, a web server, a database server, a file server, a mainframe server, or a combination thereof.

In some embodiments, the external hotlist source 110 may be server that may comprise suitable logic, circuitry, interfaces, and/or code that may be configured to communicate a plurality of hotlists of vehicles to the electronic device 102. The external hotlist source 110 may be managed and operated by a law enforcement entity. In some embodiments, the external hotlist source 110 may be an external storage device.

In operation, the electronic device 102 may be configured to receive a first hotlist of vehicles. The first hotlist of vehicles may include at least a set of license plate identifiers of a set of vehicles. Examples of a vehicle of the set of vehicles may include but is not limited to a car, a bike, a truck, a bus, or other autonomous or non-autonomous vehicle. The hotlist of vehicles, such as the first hotlist of vehicle, may be a data file received from a law enforcement entity. The hotlist of vehicles may include a defined number of license plate identifiers (e.g., vehicle license plate numbers), of certain suspect vehicles, stolen license plates, stolen vehicles, vehicles of wanted persons, and other vehicles or persons sought by the law enforcement entity. In some embodiments, the electronic device 102 may periodically extract the hotlist of vehicles, at different times of the day in order to have an up-to-date list.

In accordance with an embodiment, the electronic device 102 may be configured to store a set of original license plate templates associated with the first hotlist of vehicles. In some embodiments, the set of original license plate templates or information associated with the set of original license plates related to the vehicles in the first hotlist of vehicles may be retrieved from the second server 108B. In an exemplary implementation, the second server 108B may be owned, managed, or operated by an entity (e.g., department of motor vehicles (DMV)) that administers issuance of driver license, license plate numbers, and/or vehicle registration in a specific geographical area, such as a state. The set of original license plate templates may include one or more parameters associated with different license plates of vehicles in the first hotlist of vehicles. Examples of the one or more parameters may include but is not limited to a background color, a shape, a font color of letters and numbers, and a design pattern of different license plates in the first hotlist of vehicles. Typically, each state of a country has a specific design pattern of license plates. Further, a commercial vehicle, a private vehicle, a government vehicle, and the like, may have individual design patterns to differentiate from each other. Such parameters and information associated with the set of original license plates related to the vehicles in the first hotlist of vehicles may be considered and may be useful as a starting point to generate training datasets. For example, an alpha-numeric sequence of a license plate identifier present in the first hotlist of vehicles may indicate that a suspect vehicle to be found may be commercial vehicle and may have a license plate with yellow background color, a rectangular shape, and a black font color. In some cases, an original license plate template of the set of original license plate templates may be an image of the license plate of the suspect vehicle in the first hotlist of vehicles. In some cases, the original license plate template may be pre-stored design pattern, the information related to different license plates of each state, or simply the license plate identifiers (e.g., the license plate numbers) of the vehicles extracted from the first hotlist of vehicles.

In accordance with an embodiment, the electronic device 102 may be configured to generate a plurality of synthetic license plate images, based on at least the first original license plate template of the set of original license plate templates. Each synthetic license plate image of the generated plurality of synthetic license plate images may be a variation in at least a font style parameter of at least one original license plate template of the set of original license plate templates. For example, a first synthetic license plate image of the generated plurality of synthetic license plate images may include a first vehicle license plate number present in the first hotlist of vehicles in a "COMIC SANS" font style. A second synthetic license plate image of the generated plurality of synthetic license plate images may include the same first vehicle license plate number in a "TIMES NEW ROMAN" font style.

In accordance with an embodiment, the electronic device 102 may be further configured to generate a first augmented dataset 112 of the plurality of synthetic license plate images, by application of an image transformation on the generated plurality of synthetic license plate images. The electronic device 102 may be configured to apply the image transformation on the plurality of synthetic license plate images to augment each of the plurality of synthetic license plate images with different geometrical parameters and different visual parameters. The plurality of synthetic license plate images may be augmented with different geometrical parameters and visual parameters to a specified number of variations in appearance to the set of original license plate templates. The visual parameters utilized to augment the plurality of synthetic license plate images may correspond to a contrast, a brightness, a color, a shade, a visual pattern, an external lighting, or other visual image manipulation parameters. The geometrical parameters utilized to augment the plurality of synthetic license plate images may correspond to a translation, a scaling, a rotation, or an orientation parameter. The generated first augmented dataset 112 includes photo-realistic variations of the plurality of synthetic license plate images. After augmentation, each synthetic license plate image of the first augmented dataset 112 may appear as similar as an actual image of an actual license plate of a vehicle in the first hotlist of vehicles.

In accordance with an embodiment, the electronic device 102 may be configured to train a first neural network model using the generated first augmented dataset 112 as a training dataset. In contrast to the conventional systems, the electronic device 102 may be configured to train the first neural network model to overfit to the generated first augmented dataset 112. The first neural network model may be a deep learning model.

In some embodiments, the electronic device 102 may be configured to segment a plurality of alphanumeric characters arranged in a defined sequence for each augmented license plate image in the first augmented dataset 112 of the plurality of synthetic license plate images. The electronic device 102 may be configured to feed the segmented plurality of alphanumeric characters to the first neural network model to memorize a plurality of alphanumeric patterns present in the vehicle identifier information specific to the first hotlist of vehicles. In accordance with an embodiment, the first neural network model may include a combination of a convolutional neural network (CNN) and a recurrent neural network (RNN). The trained first neural network model may then be utilized to quickly find one or more vehicle in the received first hotlist of vehicles, based on a continuous monitoring of traffic in a real-environment.

In one implementation, the electronic device 102 may be an in-vehicle device (e.g., an electronic control unit (ECU). Further, the image sensor 104 may be an in-vehicle camera mounted on a vehicle, for example, a police car. In another implementation, the electronic device 102 may be a hand-held apparatus, a road side unit (RSU), or a portable device communicatively coupled to the image sensor 104. In such implementation, the image sensor 104 may be suitably mounted on a road portion to capture a suitable view of vehicles plying on the road portion.

In accordance with an embodiment, the image sensor 104 may be configured to capture a plurality of images 118 (e.g., an image sequence or a video) from the field-of-view 114 of the image sensor 104. The plurality of images 118 (or video) may include a plurality of vehicles which may be within the field-of-view 114 of the image sensor 104. Each of the plurality of vehicles may have a license plate, such as license plates 116A to 116E, as shown in an example. The electronic device 102 may be configured to utilize and apply the first trained neural network model on the captured plurality of images 118. The first trained neural network model may be applied to determine whether a resemblance or similarity exists between at least one augmented license plate image in the first augmented dataset 112 and a corresponding license plate image portion of a vehicle of the plurality of vehicles based on the captured plurality of images 118.

In cases where the resemblance exists, it may indicate that the vehicle is likely a suspect vehicle from the first hotlist of vehicles. In other words, if a similarity between at least one augmented license plate image in the first augmented dataset 112 and a corresponding license plate image portion of a vehicle is greater than a defined threshold value, then such vehicle may be considered a potential candidate for further enhanced validation. In cases where the resemblance or similarity is not found in the plurality of images 118 in a current field-of-view 114 of the image sensor 104, the process of monitoring and capture of subsequent images may continue.

For the validation and confirmation, the electronic device 102 may be further configured to extract the first license plate image portion (e.g., a license plate image portion that includes the license plate 116C and not entire vehicle) from the captured plurality of images 118. The first license plate image portion may be extracted from the captured plurality of images 118 based on the determined resemblance between the first license plate image portion and at least one augmented license plate image in the first augmented dataset 112. The extracted first license plate image portion may include a first license plate identifier from the set of license plate identifiers in the first hotlist of vehicles. The electronic device 102 may be configured to further extract the license plate number from only the extracted license plate image portion. In an implementation, the license plate number may be extracted from the extracted license plate image by application of an optical character recognition (OCR) technique. The electronic device 102 may be configured to search the license plate number for an alphanumeric pattern present in the set of license plate identifiers specific to the first hotlist of vehicles.

In conventional ALPR systems, typically OCR is executed on each license plate which may have been captured in the plurality of images 118 to extract a plurality of license plate numbers. This may be a computationally resource intensive process. In contrast to the conventional systems, the electronic device 102 may not perform OCR on each of a plurality of license plates captured in the captured plurality of images 118. The electronic device 102 may perform OCR only on the set of license plate image portions which may be extracted from the plurality of images 118 by use of the trained first neural network model. The electronic device 102 may apply the overfit first neural network model to perform license plate recognition in a faster and more accurate manner, in comparison with the conventional ALPR systems.

In accordance with an embodiment, the electronic device 102 may be configured to detect (or identify) at least a first vehicle in the captured plurality of images 118. For example, the vehicle with the license plate 116C may be identified as one of the vehicle indicated in the first hotlist of vehicles. The detection (or identify) of the first vehicle may be based on the extracted first license plate image portion and the trained first neural network model. The electronic device 102 may be configured to output an alert for a law enforcement user in a real time or a near-real time in response to the detection of the first vehicle in the captured plurality of images 118.

In accordance with an embodiment, the electronic device 102 may be configured to receive a second hotlist of vehicles comprising at least a set of license plate identifiers of a second set of vehicles. The received second hotlist of vehicles may be loaded to the trained first neural network by a transfer learning technique. In response to the loading of the received second hotlist of vehicle, the electronic device 102 may be configured to re-train the trained first neural network model in a real time or a near-real time to a second neural network model to overfit to a second augmented dataset specific to the second hotlist of vehicles. The second augmented dataset specific to the second hotlist of vehicles may be generated similar to the first augmented dataset 112.

In accordance with an embodiment, the electronic device 102 may be configured to detect one or more vehicles from the second set of vehicles in the captured plurality of images 118 by use of the retrained first neural network model. The electronic device 102 may be configured to detect the one or more vehicles from the captured plurality of images 118 based on a resemblance of one or more license plate image portion in the captured plurality of images 118 with at least one augmented license plate image in the second augmented dataset. The one or more license plate image portions may include license plate identifiers present in the second hotlist of vehicles.

Figure 2:
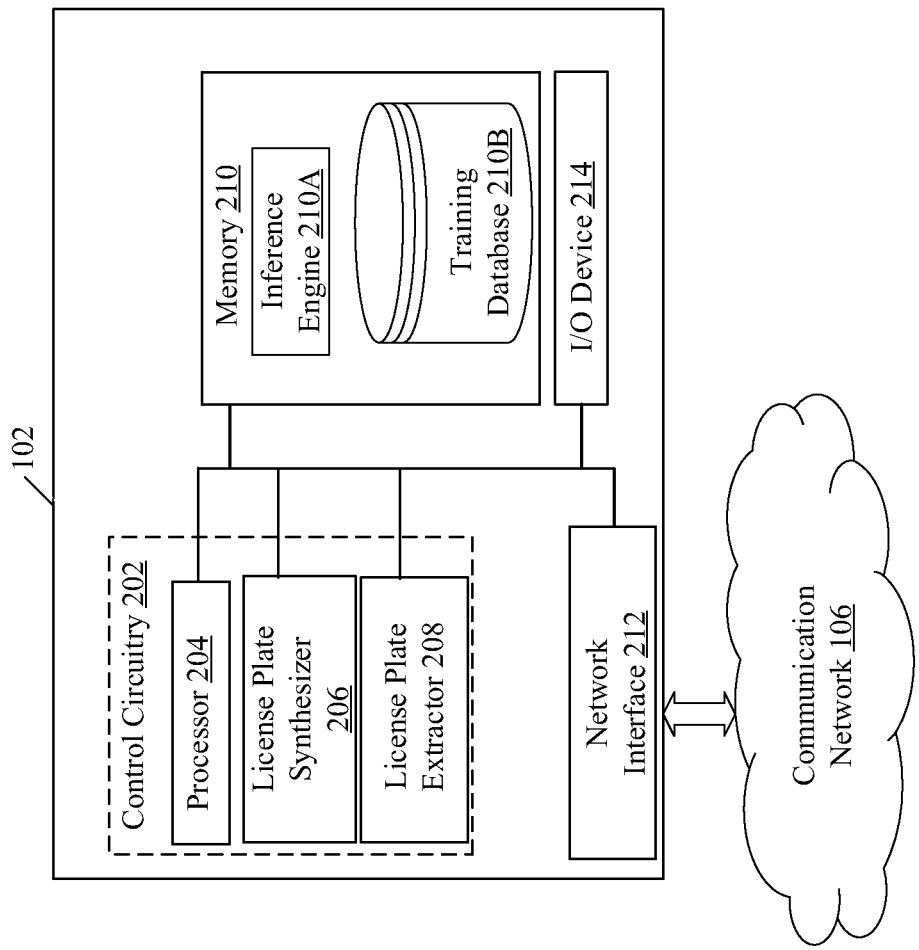
FIG. 2 is a block diagram that illustrates an exemplary an electronic device for hotlist-based license plate recognition, in accordance with an embodiment of the disclosure.

FIG. 2 is a block diagram that illustrates an electronic device for license plate recognition, in accordance with an embodiment of the disclosure. FIG. 2 is explained in conjunction with elements from FIG. 1. With reference to FIG. 2, the electronic device 102 comprises control circuitry 202 that includes a processor 204, a license plate synthesizer 206, and a license plate extractor 208. The electronic device 102 further comprises a memory 210, a network interface 212, and an input/output (I/O device) 214. The memory 210 may be configured to store an inference engine 210A and a training database 210B. In some embodiments, the inference engine 210A may be a separate chip or circuitry to manage and implement the first neural network model.

The processor 204 may comprise suitable logic, circuitry, interfaces, and/or code that may be configured to execute instructions stored in the memory 210. The processor 204 may be configured to process the captured plurality of images 118. The processor 204 may be configured to train the first neural network model to extract a plurality of license plate image portions from the captured plurality of images 118. Examples of the processor 204 may include an Application-Specific Integrated Circuit (ASIC) processor, a Complex Instruction Set Computing (CISC) processor, and/or other hardware processors.

The license plate synthesizer 206 may comprise suitable logic, circuitry, interfaces, and/or code that may be configured to generate the plurality of synthetic license plate images based on the set of original license plate templates stored in the memory 210. Examples of implementations of the license plate synthesizer 206 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The license plate extractor 208 may comprise suitable logic, circuitry, interfaces, and/or code that may be configured to extract the first license plate image portion from the captured plurality of images 118. The first license plate image portion may be extracted from the captured plurality of images 118 based on the resemblance between the first license plate image portion and at least one augmented license plate image in the first augmented dataset 112 by use of the first trained neural network model. Examples of implementations of the license plate extractor 208 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 210 may comprise suitable logic, circuitry, and/or interfaces that may be configured to store a set of instructions executable by the processor 204, the license plate synthesizer 206, and the license plate extractor 208. The memory 210 may be configured to store the inference engine 210A and the training database 210B. The inference engine 210A may be configured to apply logical rules to the first augmented dataset 112 of the plurality of synthetic license plate images, to deduce new information associated with the first hotlist of vehicles. The training database 210B may be configured to store the first augmented dataset 112 of the plurality of synthetic license plate images. The processor 204 may be configured to use the first augmented dataset 112 as the training dataset to train the first neural network model. Examples of implementation of the memory 210 may include, but are not limited to, Random Access Memory (RAM), Read Only Memory (ROM), Hard Disk Drive (HDD), and/or a Secure Digital (SD) card. The network interface 212 may comprise suitable logic, circuitry, interfaces, and/or code that may be configured to enable communication between the electronic device 102, and the first server 108A and the second server 108B via the communication network 106. The network interface 212 may implement known technologies to support wired or wireless communication with the communication network 106. The network interface 212 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 214 may comprise suitable logic, circuitry, interfaces, and/or code that may be configured to receive a plurality of inputs from the user. The I/O device 214 may comprise various input and output devices that may be configured to communicate with the electronic device 102, the first server 108A, and the second server 108B. Examples of the input devices may include, but not limited to, a touch screen, a keyboard, a mouse, a joystick, a microphone, and/or an image sensor. Examples of the output devices may include, but not limited to, a display screen (such as a Liquid Crystal Display (LCD) or a Light Emitting Diode (LED) display) and/or a speaker. The functions and operations of the processor 204, the license plate synthesizer 206, and the license plate extractor 208, may be similar to the operations of the electronic device 102, as described in FIG. 1, in an example. Other operations of the processor 204, the license plate synthesizer 206, and the license plate extractor 208, may be further understood, for example, from FIGS. 3A and 3B, and 4A to 4B.

In operation, the processor 204 may be configured to receive a first hotlist of vehicles, via the network interface 212. The license plate synthesizer 206 may be configured to generate a plurality of synthetic license plate images based on at least the first original license plate template, for example, at least the license plate numbers, in the first hotlist of vehicles. The processor 204 may be configured to apply an image transformation on the plurality of synthetic license plate images to augment each of the plurality of synthetic license plate images with different geometrical parameters and different visual parameters. More details are provided in FIG. 3A and FIG. 3B.

Figure 3A:
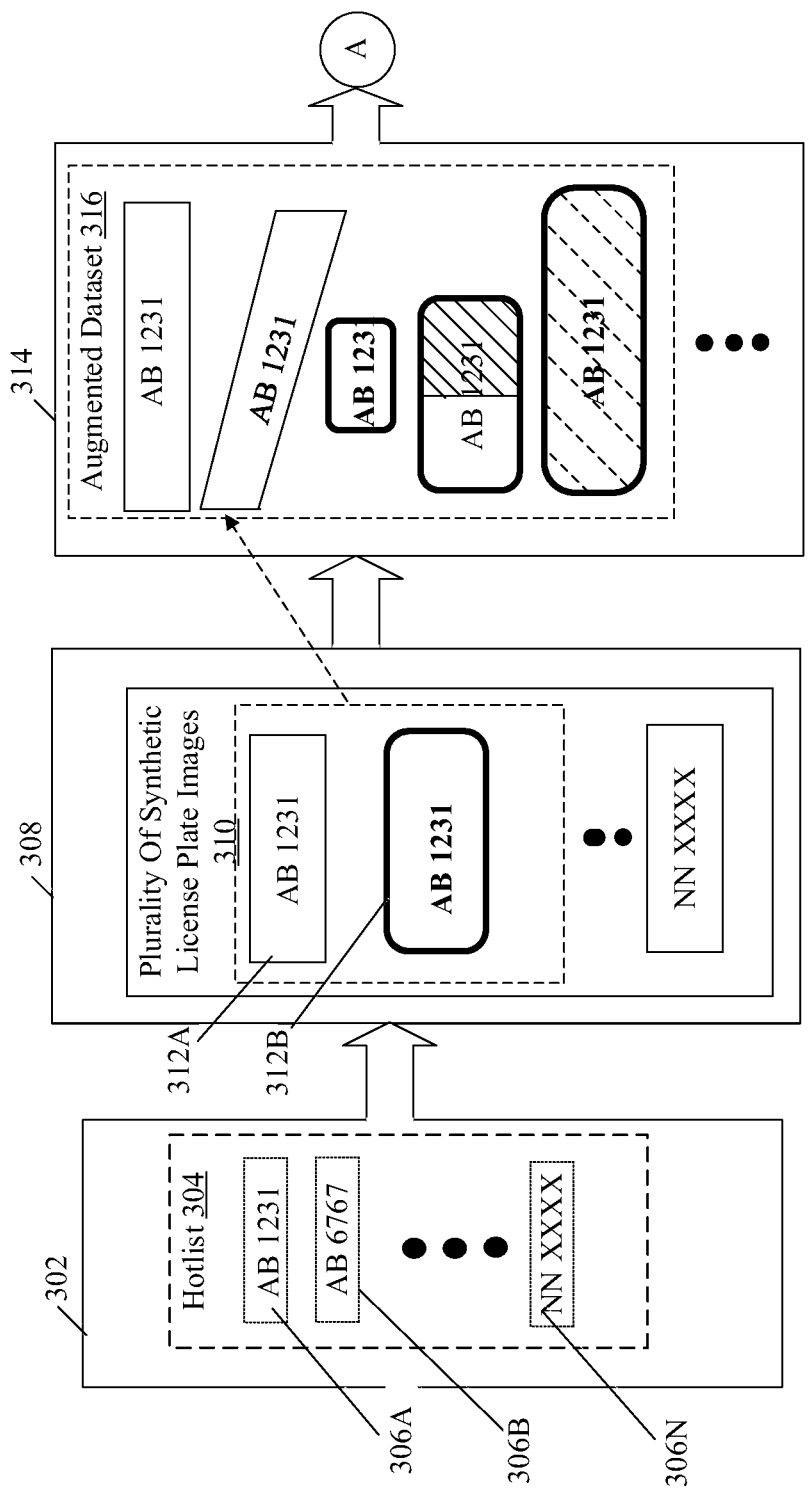
FIG. 3A and FIG. 3B, collectively, illustrate a first exemplary scenario for implementation of electronic device for hotlist-based license plate recognition using augmented dataset, in accordance with an embodiment of the disclosure.
Figure 3B:
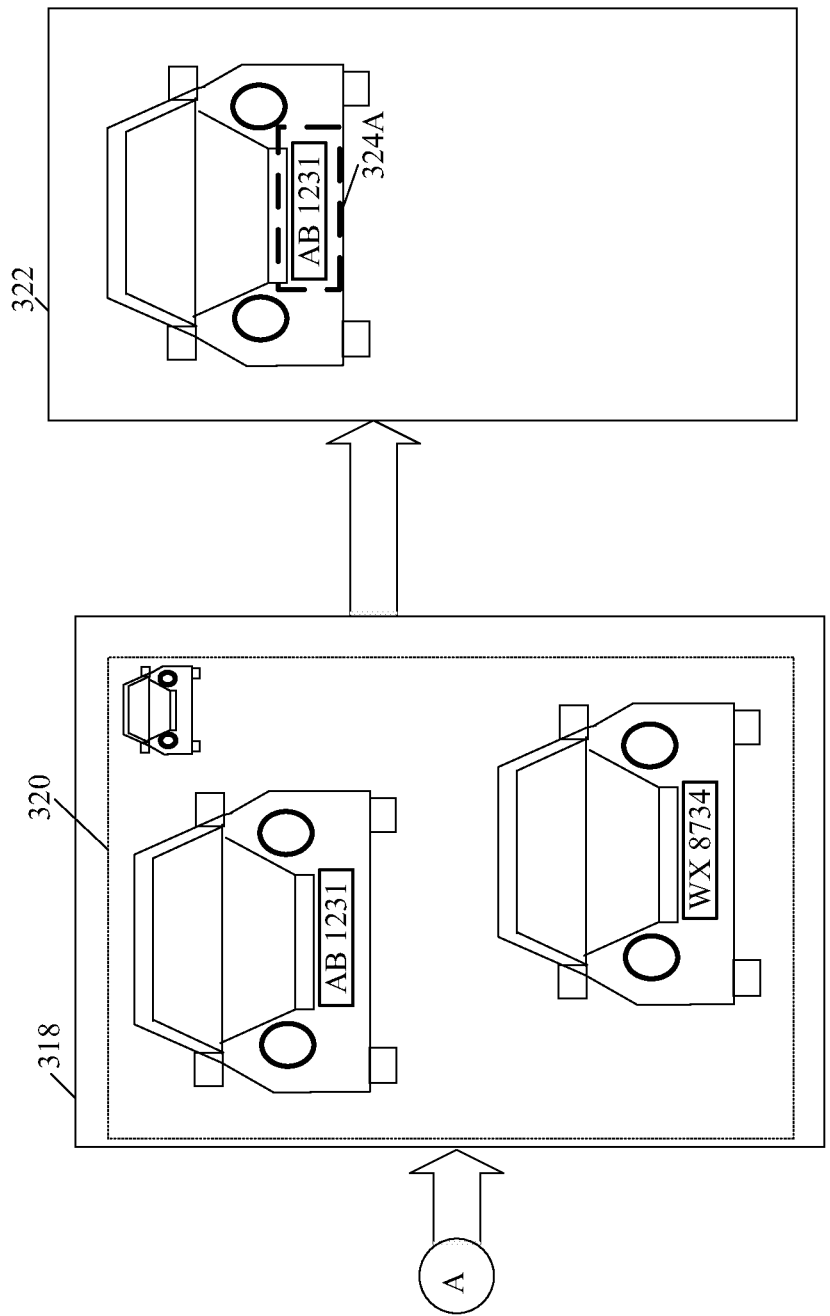

FIGS. 3A and 3B illustrates an exemplary scenario for implementation of electronic device for hotlist-based license plate recognition, in accordance with an embodiment of the disclosure. FIGS. 3A and 3B are explained in conjunction with elements from FIG. 1 and FIG. 2. With reference to FIG. 3A and 3B, there is shown a processing pipeline for the hotlist-based license plate recognition.

Referring to FIG. 3A, at 302, a hotlist 304 of vehicles may be received by the control circuitry 202, from the external hotlist source 110. The hotlist 304 of vehicles may include a plurality of license plate identifiers 306A, 306B, . . . , 306N of suspect vehicles. For example, a first license plate identifier 306A may be "AB 1231". The control circuitry 202 may be configured to store the hotlist 304 of vehicles in the memory 210. The control circuitry 202 may be configured to retrieve a set of original license plate templates associated with the hotlist 304 of vehicles, as discussed in FIG. 1.

At 308, a plurality of synthetic license plate images 310 may be generated for each original license plate template of the set of original license plate templates stored in the memory 210. The license plate synthesizer 206 may be configured to generate the plurality of synthetic license plate images 310 such that each synthetic license plate image of the plurality of synthetic license plate images 312 may vary in at least the font style parameter of at least one original license plate template of the set of original license plate templates. For example, the plurality of synthetic license plate images 312 may include at least a first synthetic license plate image 312A and a second synthetic license plate image 312B that may be a variation of each other in for at least one vehicle license plate identifier (e.g., the first license plate identifier 306A). For example, the first synthetic license plate image 312A may have a rectangular shape without rounded corners and may include a license plate number in a first font style. The second synthetic license plate image 312B may have a rectangular shape with rounded corners and may include a license plate number in a second font style that is different from the first font style.

At 314, the processor 204 may be configured to generate augmented dataset 316, by application of the image transformation on the generated plurality of synthetic license plate images 312. The image transformation may be applied on the plurality of synthetic license plate images 312 to augment each of the plurality of synthetic license plate images 312 with different geometrical parameters (e.g., different scaling, translation, rotation) and different visual parameters (e.g., different color or shade) such that each augmented synthetic license plate image appears as photo-realistic as if different images of a real license plate is captured. The processor 204 may be configured to train a first neural network model using the generated first augmented dataset 318 as a training data set. The first neural network model may be trained to overfit on the generated augmented dataset 316. The first neural network model may include a combination of the convolutional neural network (CNN) and the recurrent neural network (RNN). In certain scenarios, the first neural network model may include a long term short term memory (LSTM) based neural network.

Referring to FIG. 3B, at 318, a sequence of images 320 may be captured by the image sensor 104. The electronic device 102 may be configured to monitor a plurality of vehicles 322 present or moving along a road portion based on the captured sequence of images 320.

At 322, the processor 204 may be configured to apply the first trained neural network model on the captured sequence of images 320. The processor 204 may be configured to determine a resemblance (i.e., a match) between at least one augmented license plate image portion in the augmented dataset 316 and a license plate image portion 324A of a vehicle of the plurality of vehicles. The license plate extractor 208 may be configured to extract a license plate number in the license plate image portion 324A by application of an OCR technique on the extracted license plate image portion 324A. The processor 204 may then be configured to compare the extracted license plate number (e.g., "AB 1231") with the plurality of license plate identifiers 306A, 306B, . . . , 306N of suspect in the hotlist 304 of vehicles. Based on a match of the extracted license plate number (e.g., "AB 1231") with the first license plate identifiers 306A, it may be confirmed that the vehicle having is one of the suspect vehicle in the hotlist 304 of vehicles.

Figure 4A:
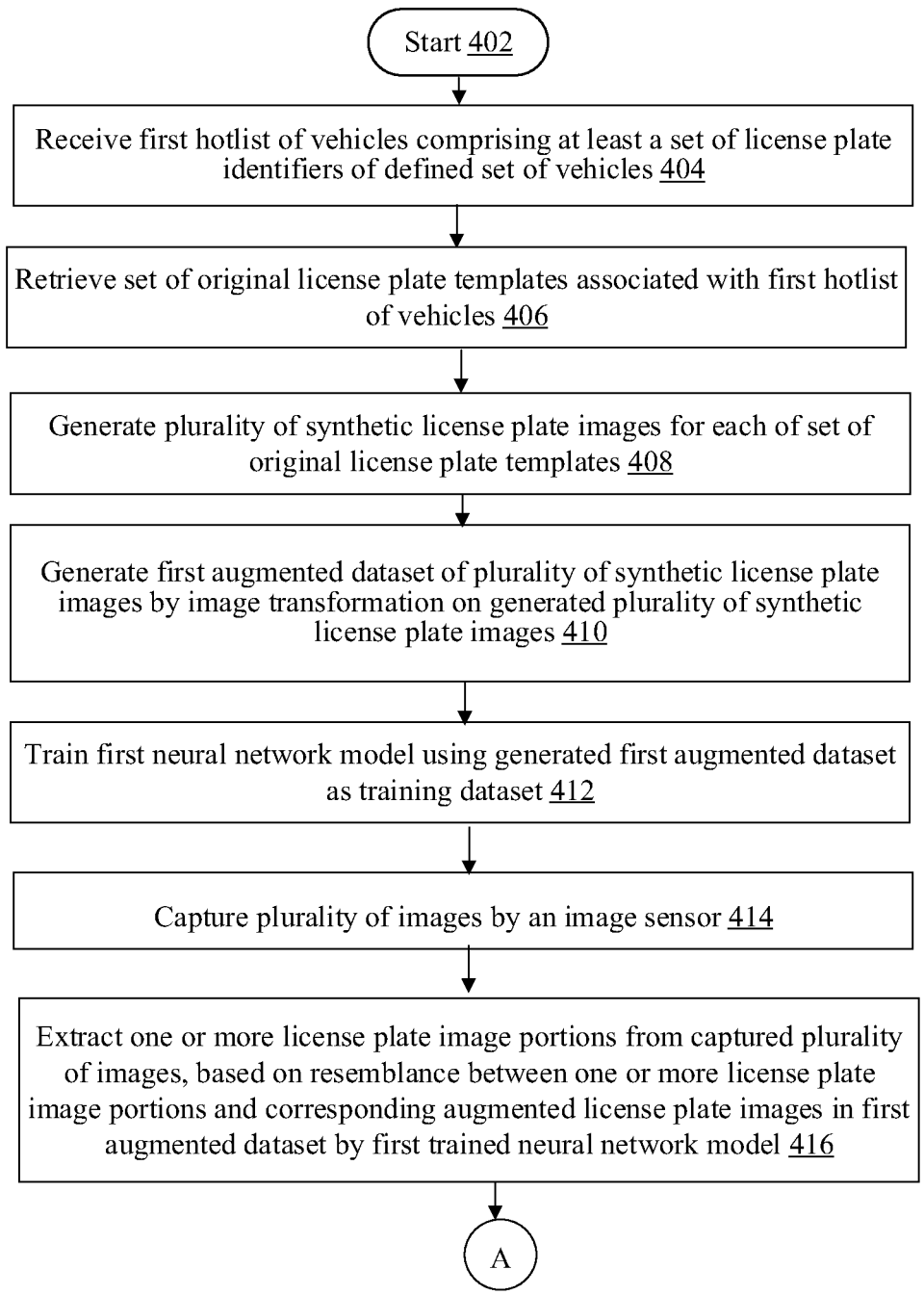
FIG. 4A and FIG. 4B, collectively, depict a flowchart that illustrates an exemplary method for hotlist-based license plate recognition, in accordance with an embodiment of the disclosure.
Figure 4B:
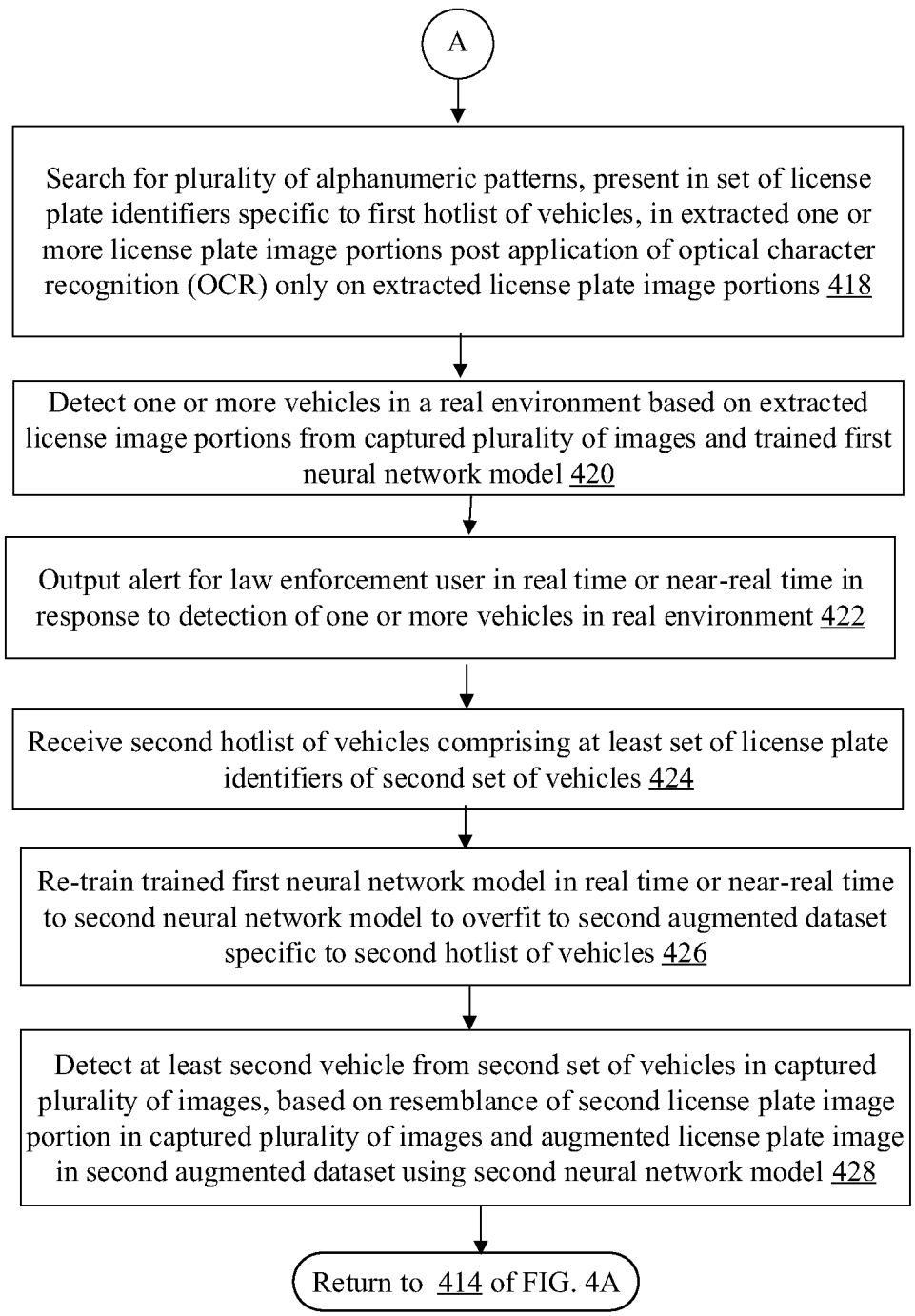

FIGS. 4A, and 4B, collectively, depict a flowchart that illustrates an exemplary method for hotlist-based license plate recognition, in accordance with an embodiment of the disclosure. With reference to FIG. 4A, there is shown a flowchart 400. The flow chart is described in conjunction with FIGS. 1, 2, 3A, and 3B. The method starts at 402 and proceeds to 404.

At 404, the first hotlist of vehicles which includes at least a set of license plate identifiers of a defined set of vehicles, may be received. The control circuitry 202 may be configured to receive the first hotlist of vehicles in the memory 210 from the external hotlist source 110, for example, a computing device managed by a law enforcement entity.

At 406, a set of original license plate templates associated with the first hotlist of vehicles may be retrieved in the memory 210. The control circuitry 202 may be configured to retrieve the set of original license plate templates in the memory 210. In some embodiments, the set of original license plate templates or information (e.g., a design pattern specific to a particular geographical location) associated with the set of original license plates related to the vehicles in the first hotlist of vehicles may be retrieved from the second server 108B. In some cases, the original license plate template may be pre-stored design pattern, the information related to different license plates of each state, or simply the license plate identifiers (e.g., the license plate numbers) of the vehicles extracted from the first hotlist of vehicles.

At 408, the plurality of synthetic license plate images may be generated for each of the set of original license plate templates. The control circuitry 202 may be configured to generate the plurality of synthetic license plate images. Each synthetic license plate image of the generated plurality of synthetic license plate images may be a variation in at least a font style parameter of at least one original license plate template of the set of original license plate templates as discussed, for example in FIG. 1.

At 410, the first augmented dataset 112 of the plurality of synthetic license plate images may be generated by the image transformation on the generated plurality of synthetic license plate images. The processor 204 may be configured to apply the image transformation on the plurality of synthetic license plate images to augment each of the plurality of synthetic license plate images with different geometrical parameters and different visual parameters, as discussed, for example, in FIG. 1.

At 412, the first neural network model may be trained using the generated first augmented dataset 112 as the training dataset. The processor 204 may be configured to train the first neural network model using the generated first augmented dataset 112 as the training data set. The first neural network model may be trained to overfit on the generated first augmented dataset 112. In accordance with an embodiment, for the training, the processor 204 may be configured to segment a plurality of alphanumeric characters arranged in the defined sequence in each augmented license plate image in the first augmented dataset 112 of the plurality of synthetic license plate images. The segmented plurality of alphanumeric characters may be fed to the RNN to memorize plurality of alphanumeric patterns present in the vehicle identifier information specific to the first hotlist of the vehicles.

At 414, a plurality of images (such as the plurality of images 118) may be captured by the image sensor 104. The plurality of images 118 may include a plurality of vehicles which are monitored and evaluated within the field-of-view 114 of the image sensor 104 as discussed, for example, in FIG. 1.

At 416, a set of license plate image portions may be extracted from the captured plurality of images 118, based on the resemblance between the set of license plate image portions and corresponding set of augmented license plate images in the first augmented dataset 112 by use of the first trained neural network model. The license plate extractor 208 may be configured to extract the set of license plate image portions from the captured plurality of images 118. Each extracted license plate image portion of the set of license plate image portions may include a license plate identifier (or number) in the first hotlist of vehicles.

At 418, a plurality of alphanumeric patterns, present in the set of license plate identifiers specific to the first hotlist of vehicles, may be searched in the extracted set of license plate image portions post application of optical character recognition (OCR) only on the extracted set of license plate image portions. The processor 204 may be configured to extract the set of license plate numbers from the captured plurality of images 118, by application of an optical character recognition (OCR) technique only on the extracted set of license plate image portions.

At 420, one or more vehicles may be detected in a real environment based on the extracted set of license image portions from the captured plurality of images 118 and the trained first neural network model. The processor 204 may be configured to detect the one or more vehicles in the captured plurality of images 118 as vehicles indicated in the first hotlist of vehicles.

At 422, an alert may be generated for a law enforcement user in a real time or a near-real time in response to the detection of the one or more vehicles in the real environment. The control circuitry 202 may be configured to output the alert for the law enforcement user in a real time or a near-real time.

At 424, a second hotlist of vehicles comprising at least a set of license plate identifiers of a second set of vehicles may be received from the external hotlist source 110. The control circuitry 202 may be configured to receive the second hotlist of vehicles, which may then be loaded to the trained first neural network by a transfer learning technique.

At 426, the first neural network model may be re-trained in a real-time or a near-real-time to the second neural network model in response to the loading of the received second hotlist of vehicle. The processor 204 may be configured to re-train the trained first neural network model to overfit to a second augmented dataset specific to the second hotlist of vehicles.

At 428, at least a second vehicle from the second set of vehicles in the captured plurality of images 118 may be detected by use of the retrained first neural network model. The second vehicle may be detected based on the resemblance of at least one license plate image portion in the captured plurality of images 118 and a corresponding augmented license plate image in the second augmented dataset. The control may return to 414 for continuous monitoring of different vehicles.

Various embodiments of the disclosure may provide a non-transitory computer readable medium and/or storage medium, and/or a non-transitory machine readable medium and/or storage medium having stored thereon, a machine code and/or a set of instructions executable by a machine, such as the electronic device 102, and/or a computer. The set of instructions in the electronic device may cause the machine and/or computer to perform the operations that comprise capture of a plurality of images. A first hotlist of vehicles comprising at least a set of license plate identifiers of a set of vehicles may be stored in a memory. A set of original license plate templates associated with the first hotlist of vehicles may be stored in the memory. A plurality of synthetic license plate images may be generated for each of the set of original license plate templates. Each synthetic license plate image of the plurality of synthetic license plate images may be a variation in at least a font style parameter of at least one original license plate template of the set of original license plate templates.

A device for license plate recognition may include an image sensor (such as the image sensor 104 (FIG. 1), a memory (such as the memory 210 (FIG. 2)), and control circuitry (such as the control circuitry 202 (FIG. 2)). The image sensor 104 may be configured to capture a plurality of images (such as the plurality of images 118 (FIG. 1)). The memory 210 may be configured to store a first hotlist of vehicles comprising at least a set of license plate identifiers of a set of vehicles. The memory 210 may be further configured to store a set of original license plate templates associated with the first hotlist of vehicles. The control circuitry 202 may be configured to generate a plurality of synthetic license plate images for each of the set of original license plate templates. Each synthetic license plate image of the plurality of synthetic license plate images may be a variation in at least a font style parameter of at least one original license plate template of the set of original license plate templates.

In accordance with an embodiment, the control circuitry 202 may be configured to generate a first augmented dataset of the plurality of synthetic license plate images by an image transformation on the generated plurality of synthetic license plate images. The plurality of synthetic license plate images may be augmented with different geometrical parameters and visual parameters to a specified number of variations in appearance to the set of original license plate templates. The control circuitry 202 may be configured to train a first neural network model using the generated first augmented dataset as a training dataset. The first neural network model may be trained to overfit to the generated first augmented dataset.

In accordance with an embodiment, the control circuitry 202 may be configured to extract a first license plate image portion from the captured plurality of images based on a resemblance between the first license plate image portion and at least one augmented license plate image in the first augmented dataset by the first trained neural network model. The control circuitry 202 may be configured to detect at least a first vehicle in the captured plurality of images based on the extracted first license plate image portion and the trained first neural network model. The extracted first license plate image portion may include a first license plate identifier from the set of license plate identifiers in the first hotlist of vehicles. The visual parameters may be utilized to augment the plurality of synthetic license plate images correspond to at least one of a contrast, a brightness, a color, a shade, a visual pattern, an external lighting, or other visual image manipulation parameter. The geometrical parameters may be utilized to augment the plurality of synthetic license plate images correspond to at least one of a translation, a scaling, a rotation, or an orientation parameter. The first neural network model may include a combination of a convolutional neural network (CNN) and a recurrent neural network (RNN).

In accordance with an embodiment, the control circuitry 202 may be configured to segment a plurality of alphanumeric characters arranged in a defined sequence for each augmented license plate image in the first augmented dataset. The control circuitry 202 may be configured to feed the segmented plurality of alphanumeric characters to the RNN to memorize a plurality of alphanumeric patterns present in the vehicle identifier information specific to the first hotlist of vehicles. The control circuitry 202 may be configured to extract a set of license plate image portions from the captured plurality of images, based on a resemblance between the set of license plate image portions and corresponding set of augmented license plate images in the first augmented dataset by the first trained neural network model.

In accordance with an embodiment, the control circuitry 202 may be configured to search for a plurality of alphanumeric patterns, present in the set of license plate identifiers specific to the first hotlist of vehicles, in the extracted set of license plate image portions post application of optical character recognition (OCR) only on the extracted set of license plate image portions. The control circuitry 202 may be configured to receive, from a second device, a second hotlist of vehicles comprising at least a set of license plate identifiers of a second set of vehicles. The received second hotlist of vehicles may be loaded in the trained first neural network.

In accordance with an embodiment, in response to the loading of the received second hotlist of vehicle, the control circuitry 202 may be configured to re-train the trained first neural network model in a real time or a near-real time to a second neural network model to overfit to a second augmented dataset specific to the second hotlist of vehicles. The control circuitry 202 may be configured to detect at least a second vehicle from the second set of vehicles in the captured plurality of images, based on a resemblance of a second license plate image portion in the captured plurality of images and at least one augmented license plate image in the second augmented dataset using the second neural network model. The second license plate image portion may include a second license plate identifier from the set of license plate identifiers in the second hotlist of vehicles. The control circuitry 202 may be configured to output an alert for a law enforcement user in a real time or a near-real time in response to the detection of the first vehicle or the second vehicle in the captured plurality of images.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A device, comprising:
   an image sensor configured to capture a plurality of images;
   a memory configured to store:
      a first hotlist of vehicles comprising at least a set of license plate identifiers of a first set of vehicles, and
      a set of original license plate templates associated with the first hotlist of vehicles; and
   control circuitry configured to:
      generate a plurality of synthetic license plate images for each of the set of original license plate templates, wherein each synthetic license plate image of the plurality of synthetic license plate images is a variation in at least a font style parameter of at least one original license plate template of the set of original license plate templates;

generate a first augmented dataset of the plurality of synthetic license plate images by an image transformation on the generated plurality of synthetic license plate images, wherein the plurality of synthetic license plate images are augmented with different geometrical parameters and visual parameters to a specified number of variations in appearance to the set of original license plate templates;

train a first neural network model using the generated first augmented dataset as a training dataset, wherein the first neural network model is trained to overfit to the generated first augmented dataset;

extract a first license plate image portion from the captured plurality of images based on a resemblance between the first license plate image portion and at least one augmented license plate image in the first augmented dataset by the trained first neural network model; and detect at least a first vehicle in the captured plurality of images based on the extracted first license plate image portion and the trained first neural network model, wherein the extracted first license plate image portion includes a first license plate identifier from the set of license plate identifiers in the first hotlist of vehicles.

2. The device of claim 1, wherein the visual parameters utilized to augment the plurality of synthetic license plate images correspond to at least one of a contrast, a brightness, a color, a shade, a visual pattern, an external lighting, or a visual image manipulation parameter.

3. The device of claim 1, wherein the geometrical parameters utilized to augment the plurality of synthetic license plate images correspond to at least one of a translation, a scaling, a rotation, or an orientation parameter.

4. The device of claim 1, wherein the first neural network model includes a combination of a convolutional neural network (CNN) and a recurrent neural network (RNN).

5. The device of claim 4, wherein the control circuitry is further configured to segment a plurality of alphanumeric characters arranged in a defined sequence for each augmented license plate image in the first augmented dataset.

6. The device of claim 5, wherein the control circuitry is further configured to feed the segmented plurality of alphanumeric characters to the RNN to memorize a plurality of alphanumeric patterns present in vehicle identifier information specific to the first hotlist of vehicles.

7. The device of claim 1, wherein the control circuitry is further configured to extract a set of license plate image portions from the captured plurality of images, based on a resemblance between the set of license plate image portions and corresponding set of augmented license plate images in the first augmented dataset by the trained first neural network model.

8. The device of claim 7, wherein the control circuitry is further configured to search for a plurality of alphanumeric patterns, present in the set of license plate identifiers specific to the first hotlist of vehicles, in the extracted set of license plate image portions post application of optical character recognition (OCR) only on the extracted set of license plate image portions.

9. The device of claim 1, wherein the control circuitry is further configured to receive, from an external device, a second hotlist of vehicles comprising at least a set of license plate identifiers of a second set of vehicles, wherein the received second hotlist of vehicles is loaded in the trained first neural network.

10. The device of claim 9, wherein the control circuitry, in response to the loading of the received second hotlist of vehicles, is further configured to re-train the trained first neural network model in one of a real time or a near-real time to a second neural network model to overfit to a second augmented dataset specific to the second hotlist of vehicles.

11. The device of claim 10, wherein the control circuitry is further configured to detect at least a second vehicle from the second set of vehicles in the captured plurality of images, based on a resemblance of a second license plate image portion in the captured plurality of images and at least one augmented license plate image in the second augmented dataset using the second neural network model, wherein the second license plate image portion includes a second license plate identifier from the set of license plate identifiers in the second hotlist of vehicles.

12. The device of claim 11, wherein the control circuitry is further configured to output an alert for a law enforcement user one of in a real time or a near-real time in response to the detection of one of the first vehicle or the second vehicle in the captured plurality of images.

13. A method, comprising:
in a device, comprising an image sensor, a memory, and control circuitry:
   capturing, by the image sensor, a plurality of images;
   storing, by the memory, a first hotlist of vehicles comprising at least a set of license plate identifiers of a first set of vehicles, and
   storing, by the memory, a set of original license plate templates associated with the first hotlist of vehicles; and
   generating, by the control circuitry, a plurality of synthetic license plate images for each of the set of original license plate templates, wherein each synthetic license plate image of the plurality of synthetic license plate images is a variation in at least a font style parameter of at least one original license plate template of the set of original license plate templates;
   generating, by the control circuitry, a first augmented dataset of the plurality of synthetic license plate images by an image transformation on the generated plurality of synthetic license plate images, wherein the plurality of synthetic license plate images are augmented with different geometrical parameters and visual parameters to a specified number of variations in appearance to the set of original license plate templates;
   training, by the control circuitry, a first neural network model using the generated first augmented dataset as a training dataset, wherein the first neural network model is trained to overfit to the generated first augmented dataset;
   extracting, by the control circuitry, a first license plate image portion from the captured plurality of images based on a resemblance between the first license plate image portion and at least one augmented license plate image in the first augmented dataset by the trained first neural network model; and
   detecting, by the control circuitry, at least a first vehicle in the captured plurality of images based on the extracted first license plate image portion and the trained first neural network model, wherein the extracted first license plate image portion includes a first license plate identifier from the set of license plate identifiers in the first hotlist of vehicles.

14. The method of claim 13, wherein the visual parameters utilized to augment the plurality of synthetic license plate images correspond to at least one of a contrast, a brightness, a color, a shade, a visual pattern, an external lighting, or a visual image manipulation parameter.

15. The method of claim 13, wherein the geometrical parameters utilized to augment the plurality of synthetic license plate images correspond to at least one of a translation, a scaling, a rotation, or an orientation parameter.

16. The method of claim 13, wherein the first neural network model includes a combination of a convolutional neural network (CNN) and a recurrent neural network (RNN).

17. The method of claim 16, further comprising segmenting, by the control circuitry, a plurality of alphanumeric characters arranged in a defined sequence for each augmented license plate image in the first augmented dataset.

18. The method of claim 17, further comprising, feeding, by the control circuitry, the segmented plurality of alphanumeric characters to the RNN to memorize a plurality of alphanumeric patterns present in vehicle identifier information specific to the first hotlist of vehicles.

19. The method of claim 13, further comprising, extracting, by the control circuitry, a set of license plate image portions from the captured plurality of images, based on a resemblance between the set of license plate image portions and corresponding set of augmented license plate images in the first augmented dataset by the trained first neural network model.

20. The method of claim 19, further comprising, searching, by the control circuitry, for a plurality of alphanumeric patterns, present in the set of license plate identifiers specific to the first hotlist of vehicles, in the extracted set of license plate image portions post application of optical character recognition (OCR) only on the extracted set of license plate image portions.

21. The method of claim 13, further comprising, receiving, by the control circuitry, from a second device, an external hotlist of vehicles comprising at least a set of license plate identifiers of a second set of vehicles, wherein the received second hotlist of vehicles is loaded in the trained first neural network.

22. The method of claim 21, further comprising retraining, by the control circuitry, the trained first neural network model in one of a real time or a near-real time to a second neural network model to overfit to a second augmented dataset specific to the second hotlist of vehicles, in response to the loading of the received second hotlist of vehicles.

23. The method of claim 22, further comprising, detecting, by the control circuitry, at least a second vehicle from the second set of vehicles in the captured plurality of images, based on a resemblance of a second license plate image portion in the captured plurality of images and at least one augmented license plate image in the second augmented dataset using the second neural network model, wherein the second license plate image portion includes a second license plate identifier from the set of license plate identifiers in the second hotlist of vehicles.

24. The method of claim 23, further comprising, outputting, by the control circuitry, an alert for a law enforcement user in one of a real time or a near-real time in response to the detection of one of the first vehicle or the second vehicle in the captured plurality of images.

* * * * *